United States Patent
Cho et al.

(10) Patent No.: US 10,322,435 B2
(45) Date of Patent: Jun. 18, 2019

(54) NATURAL COMPOSITE MATERIAL MULTILAYER STRUCTURE AND METHOD OF MANUFACTURING THE SAME

(71) Applicants: HYUNDAI MOTOR COMPANY, Seoul (KR); KIA MOTORS CORPORATION, Seoul (KR)

(72) Inventors: Hyun-Dae Cho, Seongnam-si (KR); Myoung-Ryoul Lee, Seoul (KR); Oh-Deok Kwon, Suwon-si (KR); Ki-Sung Kim, Cheonan-si (KR); Dong-Won Kim, Asan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 158 days.

(21) Appl. No.: 15/333,753

(22) Filed: Oct. 25, 2016

(65) Prior Publication Data
US 2017/0348725 A1    Dec. 7, 2017

(30) Foreign Application Priority Data

Jun. 7, 2016 (KR) .................. 10-2016-0070047

(51) Int. Cl.
| | |
|---|---|
| *B05D 1/02* | (2006.01) |
| *B05D 3/10* | (2006.01) |
| *B05D 3/12* | (2006.01) |
| *B29C 70/46* | (2006.01) |

(52) U.S. Cl.
CPC ............ *B05D 1/02* (2013.01); *B05D 3/108* (2013.01); *B05D 3/12* (2013.01); *B29C 70/467* (2013.01); *B05D 2256/00* (2013.01); *B05D 2507/02* (2013.01)

(58) Field of Classification Search
None
See application file for complete search history.

(56) References Cited

U.S. PATENT DOCUMENTS

| | | | |
|---|---|---|---|
| 4,695,501 A * | 9/1987 | Robinson ................. | B32B 5/24 428/159 |
| 5,660,908 A * | 8/1997 | Kelman ................... | B32B 3/26 428/74 |
| 2015/0158269 A1* | 6/2015 | Kim ..................... | B32B 38/0032 442/322 |

FOREIGN PATENT DOCUMENTS

| | | |
|---|---|---|
| JP | H10-138353 A | 5/1998 |
| KR | 10-2009-0116575 A | 11/2009 |
| KR | 10-2011-0102078 A | 9/2011 |
| KR | 10-2014-0000600 A | 1/2014 |
| KR | 10-2014-0094113 A | 7/2014 |
| KR | 10-1491129 B1 | 2/2015 |
| KR | 10-1543597 B1 | 8/2015 |
| KR | 10-1601861 B1 | 3/2016 |

* cited by examiner

*Primary Examiner* — Nathan T Leong
(74) *Attorney, Agent, or Firm* — Morgan, Lewis & Bockius LLP

(57) ABSTRACT

A method of manufacturing a natural composite material multilayer structure includes: manufacturing a felt layer; spraying a thermosetting resin onto one surface or both surfaces of the felt layer; forming an intermediate layer of the sprayed thermosetting resin to form a composite material; heat-pressing the composite material through a heated mold; and cold-pressing the heat-compressed composite material.

19 Claims, 2 Drawing Sheets

NATURAL COMPOSITE MATERIAL MULTILAYER STRUCTURE AND METHOD OF MANUFACTURING THE SAME

CROSS-REFERENCE TO RELATED APPLICATION

This application claims priority to the benefit of Korean Patent Application No. 10-2016-0070047, filed on Jun. 7, 2016 in the Korean Intellectual Property Office, the disclosure of which is incorporated herein by reference.

TECHNICAL FIELD

The present disclosure relates to a natural composite material multilayer structure and a method of manufacturing the same, and more particularly, to a natural composite material multilayer structure, which employs a natural composite material having high strength and has environmentally-friendly properties and light weight, and a method of manufacturing the same.

BACKGROUND

Recently, as environmental problems are on the rise around the world, methods of reducing fuel consumption to cope with these problems are developed in a whole range of industries. In order to reduce fuel consumption, solutions proposed in the automobile industry include improvement of efficiency of a vehicle engine and weight reduction of a vehicle. Vehicle weight reduction is one of good measures to increase fuel efficiency of a vehicle. However, the vehicle weight reduction may cause problems, such as a difficulty in satisfying strength and durability requirements of vehicles. Therefore, addressing of these problems is the most important goal in the automobile industry.

Accordingly, due to the environmentally-friendly trends, the automobile industry have developed various eco-friendly vehicles while aiming for reduction of the carbon dioxide emission amount to 95 g/km, corresponding to 27% of the current carbon dioxide emission amount, up to 2021 on the basis of European regulations. Further, in order to satisfy a U.S. Corporate Average Fuel Economy (CAFE) regulation value in 2025, i.e., 54.5 mpg (23.2 km/l), automakers strive to develop downsizing technologies and fuel efficiency improvement technologies.

Further, the use of materials in consideration of the environments has been required in the automobile industry, and in order to meet the requirements for preventing environmental pollution, various research and development of eco-friendly and lightweight materials, for example, natural fibers, bio-plastics, lightweight materials, etc., have been carried out.

Accordingly, a natural fiber reinforced board has been manufactured by forming a felt layer by needle-punching natural fiber and chemical fiber and is molded into a vehicle interior part through heat pressing using a flat plate and cold press molding. However, such a natural fiber reinforced board has limited weight reduction effects and requires additional pose-processing, thus excessively raising manufacturing costs.

The present disclosure has been developed, in view of the above problems, to provide a natural composite material multilayer structure and a method of manufacturing the same.

SUMMARY

The present disclosure has been made in view of the above problems of the related art, and it is an object of the present disclosure to provide a natural composite material multilayer structure which may reduce the weight of a part applied to a vehicle interior material and secure strength of the part.

Further, it is another object of the present disclosure to provide a method of manufacturing a natural composite material multilayer structure in which one process added to a conventional method may be omitted so as to simplify the manufacturing method and to reduce manufacturing costs.

Technical objects to be achieved by the present disclosure are not limited to those mentioned above, and other objects may be clearly understood by those skilled in the art from the description given below.

In accordance with an embodiment in the present disclosure, a method of manufacturing a natural composite material multilayer structure includes: manufacturing a felt layer; spraying a thermosetting resin onto one surface or both surfaces of the felt layer; forming an intermediate layer of the sprayed thermosetting resin to form a composite material; heat-pressing the composite material through a heated mold; and cold-pressing the heat-compressed composite material.

The felt layer may include natural fiber.

The natural fiber may include one or more of jute, hemp, bamboo and sisal.

The felt layer may include a mixture of natural fiber and synthetic fiber.

The synthetic fiber may include polypropylene or polyester.

The synthetic fiber may have a content exceeding 0% by weight and being 50% by weight or less with respect to the overall weight of the felt layer.

A polypropylene-based film, a polyolefin-based film or a non-woven fabric may be applied to one surface of the felt layer.

The polypropylene-based film, the polyolefin-based film or the non-woven fabric may have a weight of 50 to 200 $g/m^2$.

The felt layer may further include glass fiber or carbon fiber.

The thermosetting resin may have a content of 10 to 60% by weight with respect to the overall weight of the natural composite material multilayer structure.

The thermosetting resin may be one selected from the group of urethane, epoxy and acrylic resin, or be one of mixtures of two or more thereof.

In accordance with another aspect of the present disclosure, a natural composite material multilayer structure is manufactured by the above-described method.

BRIEF DESCRIPTION OF THE DRAWINGS

The above and other objects, features and other advantages of the present disclosure will be more clearly understood from the following detailed description taken in conjunction with the accompanying drawings.

DETAILED DESCRIPTION

Figure 1:
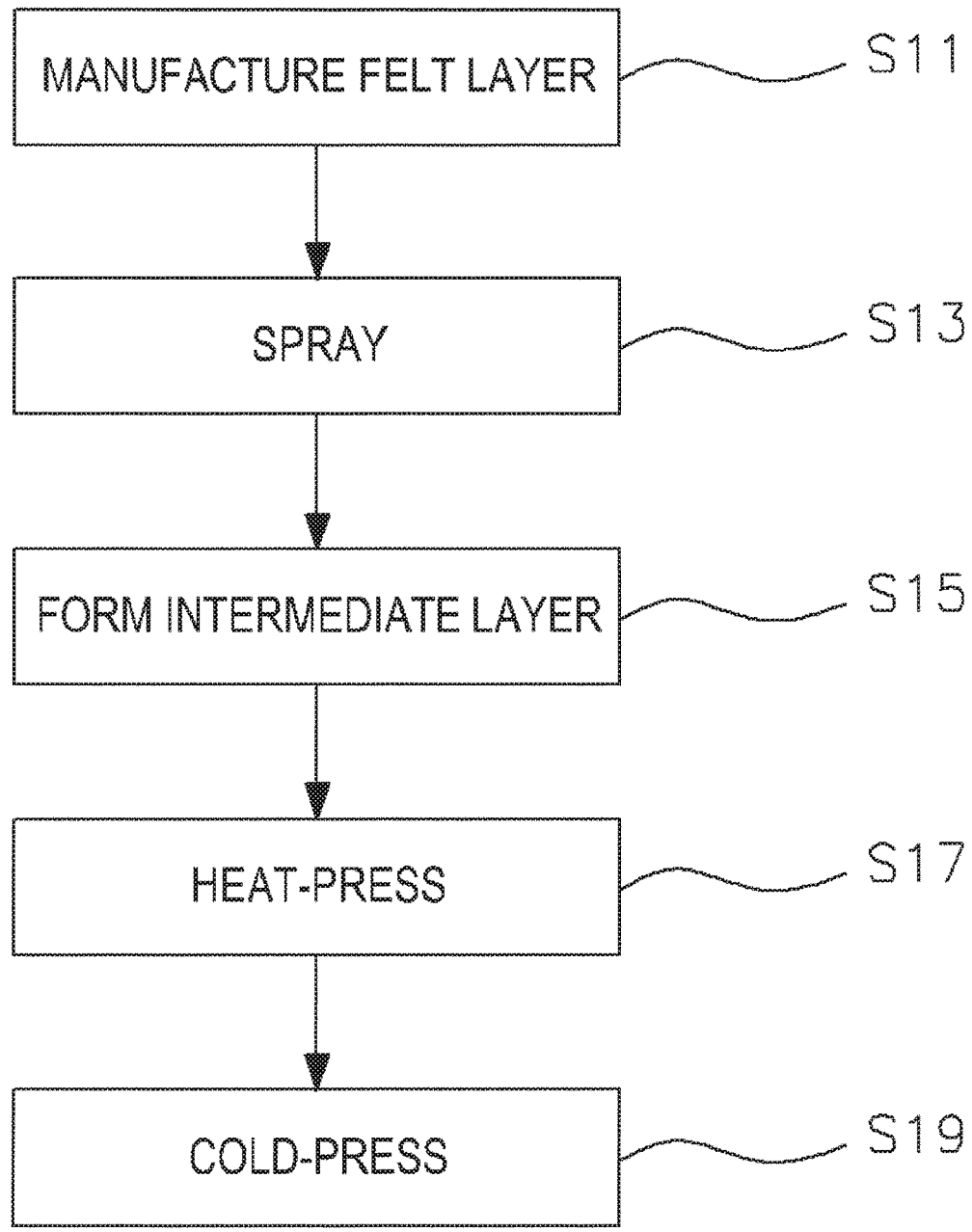
FIG. 1 is a flowchart illustrating a method of manufacturing a natural composite material multilayer structure in accordance with one embodiment in the present disclosure.

Hereinafter, exemplary embodiments in the present disclosure will be described in detail with reference to the accompanying drawings. The terms or words used in the specification and claims of the present disclosure are not interpreted to have typical or dictionary limited meanings, and are interpreted to have meanings and concepts conforming to the technical sprit of the present disclosure based on the principle that the inventors can appropriately define the concepts of the terms to explain the present disclosure in the best manner. Accordingly, it is to be understood that the detailed description, which will be disclosed along with the accompanying drawings, is intended to describe the exemplary embodiments in the present disclosure and is not intended to represent all technical ideas of the present disclosure. Therefore, it should be understood that various equivalents and modifications can exist which can replace the embodiments described at the time of application.

Recently, environmental problems are on the rise in a whole range of industries and, in the same manner, various methods to solve environmental pollution problems are employed in the automobile industry. Among the various methods, the automobile industry strives to reduce environmental contaminants, such as exhaust gas, etc., by increasing fuel efficiency of a vehicle per unit litter through vehicle weight reduction and to minimize emission of environmental contaminants, caused by materials, using environmentally-friendly materials. As one measure, various research and development to use eco-friendly and lightweight materials, i.e., natural fibers, bio-plastics, etc., has been carried out. In general, a structure for vehicle interior materials includes a core layer, a reinforcing layer and a skin layer, and conventional multilayer structures include a natural fiber reinforced board, recycling felt, resin felt, glass fiber/polyurethane foam, natural fiber sheet/polyolefin foam, etc. Thereamong, composite materials using environmentally-friendly materials may be divided into a natural fiber reinforced board manufactured by needle-punching natural fiber and chemical fiber, a composite material manufactured by laminating a natural fiber sheet and polyolefin foam, and a natural fiber/thermosetting binder manufactured by impregnating natural fiber with a thermosetting resin, and the composite materials using environmentally-friendly materials are applied to rear shelves, trunk trims, headliners, door trims, etc. of vehicles.

A conventional natural fiber reinforced board has been manufactured by forming a felt layer by needle-punching natural fiber and chemical fiber and is molded into a vehicle interior part through heat pressing using a flat plate and cold press molding. However, such a conventional manufactured board has limited weight reduction effects. Further, a natural sheet/polyolefin foam composite material is a lightweight composite material, which is developed as a substitute for a glass fiber (GF)/polyurethane (PU) foam composite material and includes natural fiber and chemical fiber reinforcing layers and a polyolefin foam, and is applied as a material for headliners requiring a relatively low strength. Moreover, a natural fiber/thermosetting binder is a high stiffness material, which is developed as a substitute for a material for vehicle interior door trims, i.e., polypropylene (PP), achieves weight reduction of a high level by applying a thermosetting resin having high stiffness as a skin material, but a skin material/rear bracket is attached to a core using hot-melting or an adhesive after manufacture of the core and thus manufacturing costs of the natural fiber/thermosetting binder due to post-processing are excessively raised.

Accordingly, the present disclosure, which has been developed in view of the above problems, relates to a natural composite material multilayer structure and a method of manufacturing the same. An aspect of the present disclosure relates to a method of a natural composite material multilayer structure.

Referring to FIG. 1, a method of manufacturing a natural composite material multilayer structure in accordance with the present disclosure includes manufacturing a felt layer (S11), spraying a thermosetting resin onto one surface or both surfaces of the felt layer (S13), forming an intermediate layer of the sprayed thermosetting resin to form a composite material (S15), heat-pressing the composite material through a heated mold (S17), and cold-pressing the heat-compressed composite material (S19). Further, the felt layer may be manufactured using natural fiber, and the natural fiber may include one or more of jute, hemp, bamboo and sisal. Further, the felt layer may be manufactured by mixing natural fiber and synthetic fiber, and the synthetic fiber may include polypropylene or polyester. The synthetic fiber may have a content which exceeds 0% by weight and is 50% by weight or less with respect to the overall weight of the felt layer, and a polypropylene-based film, a polyolefin-based film or a non-woven fabric may be applied to one surface of the felt layer. Further, the polypropylene film, the polyolefin film or the non-woven fabric may have a weight of 50 to 200 g/m$^2$, and the felt layer may further include glass fiber or carbon fiber. Moreover, the thermosetting resin may have a content of 10 to 60% by weight with respect to the weight of the natural composite material multilayer structure, and be one selected from the group of urethane, epoxy and acrylic resin, or one of mixtures of two or more thereof.

More specifically, FIG. 1 is a flowchart illustrating a method of manufacturing a natural composite material multilayer structure in accordance with one embodiment in the present disclosure. The method according to the present disclosure includes manufacturing a felt layer using natural fiber (S11) and spraying a thermosetting resin onto one surface or both surfaces of the manufactured felt layer (S13). Thereafter, the method of the present disclosure includes forming an intermediate layer of the sprayed thermosetting resin by folding the felt layer or through other methods so as to form a composite material (S15), heat-pressing the natural composite material including the natural fiber and the thermosetting resin, located in a heated mold (S17), and cold-pressing the heat-compressed composite material to realize a product shape (S19).

In more detail, the felt layer may be manufactured using natural fiber, the natural fiber felt layer may be manufactured using jute, hemp, bamboo and sisal, and mineral fiber, such as glass fiber or carbon fiber, may be added to the natural fiber felt layer. Further, the felt layer may be manufactured by mixing natural fiber and synthetic fiber, i.e., polypropylene or polyester, and, if natural fiber and synthetic fiber are mixed, the synthetic fiber may have a content of 50% by weight or less with respect to the overall weight of the felt layer.

Further, a polypropylene-based film, a polyolefin-based film or a non-woven fabric having a weight of 50 to 200 g/m$^2$ may be applied to one surface of the felt layer in consideration of post-processing, i.e., attachment of a skin material and a bracket, thereby being capable of solving a noise problem and improving strength of the natural composite material multilayer structure. Thereby, a problem, i.e., addition of a process of attaching a skin material or a rear bracket to a core using hot-melting or an adhesive in a conventional natural fabric/thermosetting binder technology, may be solved.

Further, the thermosetting resin may be sprayed onto one surface or both surfaces of the felt layer to form a thermosetting resin layer, and the sprayed thermosetting resin may have a content of 10 to 60% of the overall weight of the natural composite material multilayer structure. If the thermosetting resin having a content of less than 10% is sprayed, the content of the thermosetting resin is insufficient, the thermosetting resin is not sufficiently bonded to the natural fiber if a base material is formed, deviation among portions are increased, flexural strength is lowered, quality of the exterior of a product is lowered, and poor molding occurs. On the other hand, if the thermosetting resin having a content exceeding 60% is sprayed, the content of the thermosetting resin is excessive, flowability within the mold when a product is formed by molding is lowered and, thus molding of the product is difficult. Further, the thermosetting resin may be one selected from the group of urethane, epoxy and acrylic resin, or a mixture of two or more thereof.

Figure 2:
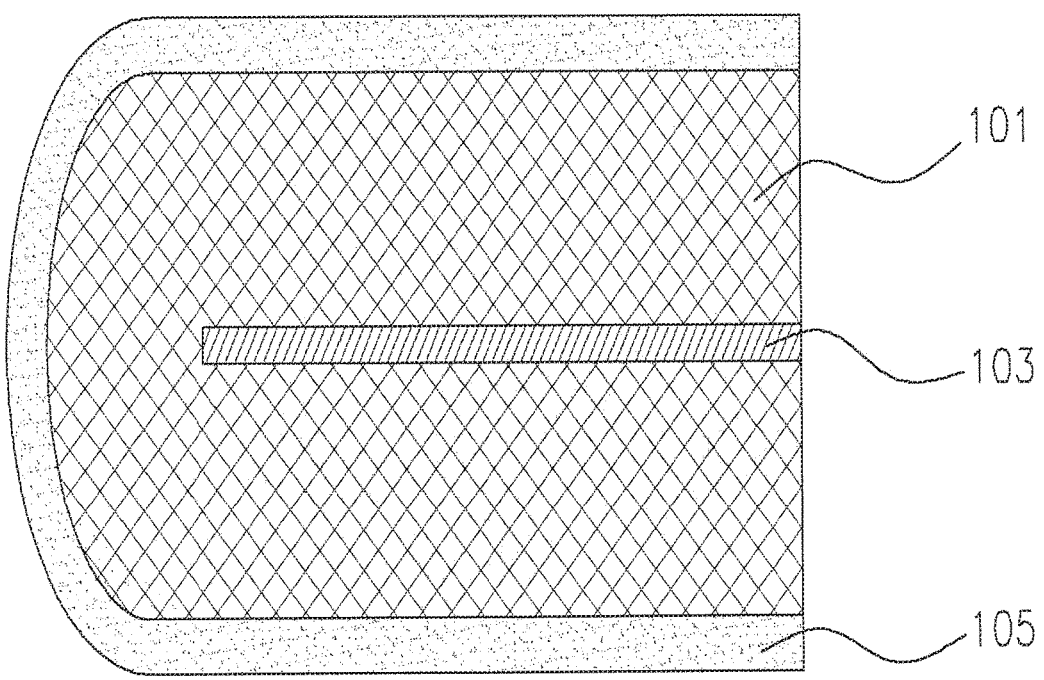
FIG. 2 is a cross-sectional view of a natural composite material multilayer structure in accordance with one embodiment in the present disclosure.

Another aspect of the present disclosure relates to a natural composite material multilayer structure. FIG. 2 is a cross-sectional view of a natural composite material multilayer structure in accordance with one embodiment in the present disclosure. A natural fiber felt layer 101 is stacked on a polyolefin-based film layer 105, and a thermosetting resin 103 is sprayed onto the felt layer 101. A natural composite material multilayer structure is formed by folding an acquired natural composite material including the polyolefin-based film layer 105, the natural fiber felt layer 101 and the thermosetting resin 103 or through other methods. Thereby, as exemplarily shown in FIG. 2, the thermosetting resin 103 forms an intermediate layer, the natural fiber felt layer 101 is formed on the upper and lower surfaces of the intermediate layer formed of the thermosetting resin 103, and the polyolefin-based film 105 surrounds the natural fiber felt layer 101.

TEST EXAMPLES

Hereinafter, the present disclosure will be described in more detail through Test examples. The Test examples are only to exemplarily describe the present disclosure, and those skilled in the art will appreciate that the Test examples do not limit the scope of the invention.

layer structures of the present disclosure. In Table 1 above, a natural fiber felt layer having a ratio of natural fiber to synthetic fiber of 60% by weight:40% by weight, a polypropylene-based film attached to one surface of the natural fiber felt layer has a weight of 100 g/m$^2$, and a thermosetting resin is sprayed onto the other surface of the natural fiber felt layer according to weights stated in Table 1. After spraying, an intermediate layer is formed using the thermosetting resin, and a natural composite material multilayer structure provided with the intermediate layer is heat-pressed at a temperature of 210° C. for 40 seconds (however, in Comparative example 2, at a temperature of 180° C. for 40 seconds through hot forming), molded through a cold pressing mold, and then cured.

In Comparative example 1, the natural fiber felt layer has a content of 100% by weight and the polypropylene-based film is applied. In Comparative example 2, the natural fiber felt layer has a content of 60% by weight, the thermosetting resin as a surface layer has a content of 40% by weight, and hot forming is carried out at a temperature of 1801 for 40 seconds and thus causes non-application of the polypropylene-based film. In Comparative example 3, the natural fiber felt layer has a content of 95% by weight, the thermosetting resin as an intermediate layer has a content of 5% by weight, and the polypropylene-based film is applied. In Comparative example 4, the natural fiber felt layer has a content of 35% by weight, the thermosetting resin as an intermediate layer has a content of 65% by weight, and the polypropylene-based film is applied. On the other hand, in Test example 1, the natural fiber felt layer has a content of 80% by weight, the thermosetting resin as an intermediate layer has a content of 20% by weight, and the polypropylene-based film is applied. In Test example 2, the natural fiber felt layer has a content of 70% by weight, the thermosetting resin as an intermediate layer has a content of 30% by weight, and the polypropylene-based film is applied. In Test example 3, the natural fiber felt layer has a content of 60% by weight, the

TABLE 1

| Configuration | Comparative example 1 | Comparative example 2 | Comparative example 3 | Comparative example 4 | Test example 1 | Test example 2 | Test example 3 |
|---|---|---|---|---|---|---|---|
| Natural fiber felt layer | 100% by weight | 60% by weight | 95% by weight | 35% by weight | 80% by weight | 70% by weight | 60% by weight |
| Thermosetting resin | — | 40% by weight (skin layer) | 5% by weight (intermediate layer) | 65% by weight (intermediate layer) | 20% by weight (intermediate layer) | 30% by weight (intermediate layer) | 40% by weight (intermediate layer) |
| Application of film | Applied | Non-applied (impossible) | Applied | Applied | Applied | Applied | Applied |

Table 1 above compares configurations of conventional multilayer structures and natural composite material multilayer structures of the present disclosure.

thermosetting resin as an intermediate layer has a content of 40% by weight, and the polypropylene-based film is applied.

|  | Comparative example 1 | Comparative example 2 | Comparative example 3 | Comparative example 4 | Test example 1 | Test example 2 | Test example 3 |
|---|---|---|---|---|---|---|---|
| Weight (g/m$^2$) | 1800 | 1480 | 1450 | 1460 | 1440 | 1550 | 1430 |
| Flexural strength (kgf/cm$^2$) | 355 or more | 380 | Measurement impossible | Measurement impossible | 409 | 445 | 410 |
| Weight reduction rate (%) | — | 18 | — | — | 19 | 14 | 20 |

-continued

|  | Comparative example 1 | Comparative example 2 | Comparative example 3 | Comparative example 4 | Test example 1 | Test example 2 | Test example 3 |
|---|---|---|---|---|---|---|---|
| Simultaneous forming of skin material or bracket | Possible | Impossible | — | — | Possible | Possible | Possible |
| Note | — | — | Poor molding (generation of deviation among portions) | Poor molding (insufficient formability of resin) | — | — | — |

Table 2 above compares properties of the components of Table 1. At present, vehicle interior materials have flexural strength of a level of 355 kgf/cm² or more. Therefore, an object of the present disclosure is to provide flexural strength above this level and to improve a weight reduction rate and formability. With reference to Table 2, Comparative example 1 results in no weight reduction rate and strength similar to conventional multilayer structures. Comparative example 2 results in a weight reduction rate of 18% and flexural strength of 380 kgf/cm² but causes impossibility of simultaneously forming a skin material or a bracket. Further, it may be understood that Comparative examples 3 and 4 cause poor molding and may thus be applied to actual products. On the other hand, it may be understood that Test example 1 results in a weight reduction rate of 19% and flexural strength of 409 kgf/cm² and allows a skin material or a bracket to be simultaneously formed. It may be understood that Test example 2 results in a weight reduction rate of 14% and flexural strength of 445 kgf/cm² and allows a skin material or a bracket to be simultaneously formed. It may be understood that Test example 3 results in a weight reduction rate of 20% and flexural strength of 410 kgf/cm² and allows a skin material or a bracket to be simultaneously formed. It may be understood from comparison of properties of Table 2 that Test examples 1 to 3 may achieve weight reduction, secure sufficient strength and satisfy formability, simultaneously.

More specifically, it may be understood, from test results of Comparative example 1 and Test examples 1 to 3 in accordance with the present disclosure, that a natural composite material multilayer structure in the present disclosure forms an intermediate layer by addition of a thermosetting resin, has improved flexural strength, as compared to the multilayer structure of Comparative example 1, and thus achieves weight reduction while exhibiting stiffness of the same level as Comparative example 1. Further, it may be understood, from test results of Comparative example 2, in which the thermosetting resin forms a skin layer and no film sheet is applied, and Test examples 1 to 3 in accordance with the present disclosure, that a skin material or a bracket may be simultaneously formed through application of the film to the surface. Moreover, it may be understood, from test results of Comparative examples 3 and 4 and Test examples 1 to 3 in accordance with the present disclosure, that, if the thermosetting resin does not correspond to 10 to 60% by weight of the weight of the natural composite material multilayer structure, problems occur due to excessive deviation among portions and insufficient formability when products are manufactured. Accordingly, it may be understood, through the above comparison, that, when a natural composite material multilayer structure is formed, a proper content of the thermosetting resin is required, particularly, if the content of the thermosetting resin is 10 to 60% by weight with respect to the overall weight of the natural composite material multilayer structure, a multilayer structure satisfying the objects of the present disclosure may be manufactured. Thereby, a natural composite material multilayer structure, which may have excellent weight reduction effects without lowering of strength and be formed simultaneously with a skin material, may be manufactured.

A natural composite material multilayer structure of the present disclosure forms an intermediate layer by spraying a thermosetting resin having high stiffness and excellent flexural strength onto a felt layer formed of 2 or more kinds of natural fiber or 2 or more kinds of natural fiber and synthetic fiber, thus being capable of acquiring weight reduction, odor reduction and environmentally-friendly effects through improvement of stiffness, as compared to a general natural fiber board. Further, through a method of manufacturing the natural composite material multilayer structure, if there is an additional attachment, such as a skin material or a rear bracket, the attachment may be attached to a base material simultaneously with formation of the base material and thus an additional process may be omitted and cost reduction may be achieved, thereby securing economic feasibility.

As is apparent from the above description, a natural composite material multilayer structure in accordance with the present disclosure may reduce the weight of a part applied to a vehicle interior material and secure strength of the part.

Moreover, a method of manufacturing a natural composite material multilayer structure in accordance with the present disclosure omits an additional process, thereby simplifying the manufacturing process of the natural composite material multilayer structure and reducing manufacturing costs of the natural composite material multilayer structure.

Although the exemplary embodiments in the present disclosure have been disclosed for illustrative purposes, those skilled in the art will appreciate that various modifications, additions and substitutions are possible, without departing from the scope and spirit of the invention as disclosed in the accompanying claims.

What is claimed is:
1. A method of manufacturing a natural composite material multilayer structure, the method comprising:
   manufacturing a felt layer;
   spraying a thermosetting resin onto one surface of the felt layer;
   folding the felt layer such that the felt layer has an upper layer and a lower layer;
   forming an intermediate layer having the sprayed thermosetting resin between the upper layer and the lower layer of the felt layer by folding the felt layer such that the sprayed thermosetting resin contacts the upper layer and the lower layer of the felt layer to form a composite material of the sprayed thermosetting resin and the felt layer;

heat-pressing the composite material through a heated mold; and cold-pressing the heat-compressed composite material.

2. The method according to claim 1, wherein the felt layer includes natural fiber.

3. The method according to claim 2, wherein the natural fiber includes one or more of jute, hemp, bamboo, and sisal.

4. The method according to claim 1, wherein the felt layer includes a mixture of natural fiber and synthetic fiber.

5. The method according to claim 4, wherein the synthetic fiber includes polypropylene.

6. The method according to claim 4, wherein the synthetic fiber has a content exceeding 0% by weight and being 50% or less by weight with respect to the overall weight of the felt layer.

7. The method according to claim 4, wherein the synthetic fiber includes polyester.

8. The method according to claim 1, wherein a polypropylene-based film is applied to the one surface of the felt layer.

9. The method according to claim 8, wherein the polypropylene-based film has a weight of 50 to 200 g/m$^2$.

10. The method according to claim 1, wherein the felt layer further includes glass fiber.

11. The method according to claim 1, wherein the thermosetting resin has a content of 10 to 60% by weight with respect to the overall weight of the natural composite material multilayer structure.

12. The method according to claim 11, wherein the thermosetting resin is one selected from the group consisting of urethane, epoxy, and acrylic resin.

13. The method according to claim 11, wherein the thermosetting resin is one of mixtures of two or more of urethane, epoxy and acrylic resin.

14. The method according to claim 1, wherein the step of spraying the thermosetting resin includes spraying onto both surfaces of the felt layer.

15. The method according to claim 1, wherein a polyolefin-based film is applied to the one surface of the felt layer.

16. The method according to claim 15, wherein the polyolefin-based film has a weight of 50 to 200 g/m$^2$.

17. The method according to claim 1, wherein a non-woven fabric is applied to the one surface of the felt layer.

18. The method according to claim 17, wherein the non-woven fabric has a weight of 50 to 200 g/m$^2$.

19. The method according to claim 1, wherein the felt layer further includes carbon fiber.

* * * * *